US007606208B2

(12) United States Patent
Benveniste

(10) Patent No.: US 7,606,208 B2
(45) Date of Patent: Oct. 20, 2009

(54) DISTRIBUTED ARCHITECTURE FOR DEPLOYING MULTIPLE WIRELESS LOCAL-AREA NETWORKS

(75) Inventor: Mathilde Benveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 703 days.

(21) Appl. No.: 10/731,348

(22) Filed: Dec. 9, 2003

(65) Prior Publication Data

US 2004/0143681 A1    Jul. 22, 2004

Related U.S. Application Data

(60) Provisional application No. 60/431,706, filed on Dec. 9, 2002.

(51) Int. Cl.
*H04W 4/00* (2006.01)
(52) U.S. Cl. .............. 370/338; 370/310.2; 370/328; 370/469; 709/279
(58) Field of Classification Search ............ 370/310.2, 370/328, 338, 469; 709/249
See application file for complete search history.

(56) References Cited

U.S. PATENT DOCUMENTS

| 6,870,822 | B2 * | 3/2005 | Balogh ................. 370/332 |
| 7,209,467 | B2 * | 4/2007 | Liu et al. ............... 370/338 |
| 2002/0060995 | A1 * | 5/2002 | Cervello et al. .......... 370/332 |
| 2003/0081547 | A1 * | 5/2003 | Ho ...................... 370/229 |
| 2003/0174664 | A1 * | 9/2003 | Benveniste .............. 370/317 |
| 2003/0189915 | A1 | 10/2003 | Miller |
| 2004/0105412 | A1 * | 6/2004 | He et al. ................ 370/338 |

FOREIGN PATENT DOCUMENTS

WO    03096707 A2    11/2003

OTHER PUBLICATIONS

Parkvall S. et al, The Evolution of WCDMA Towards Higher Speed Downlink Packet Data Access, VTC 2001 Spring, IEEE VTS 53rd Vehicular Technology Conference, Rhodes, Greece, XP-002189516, May 6-9, 2001, IEEE, US, vol. 3 of 4, Conf. 53, May 6, 2001.
Universal Mobile Telecommunications System (UMTS); UTRA High Speed Downlink Packet Access (HSDPA); Overall Description; Stage 2 (3GPP TS 25.308 version 5.4.0 Release 5) European Telecommunications Standards Institute, Mar. 2003, XP-014008696, vol. 3-R2, No. V540, Sophia-Antipo, France.

(Continued)

*Primary Examiner*—William Trost, IV
*Assistant Examiner*—Toan D Nguyen
(74) *Attorney, Agent, or Firm*—DeMont & Breyer, LLC

(57) ABSTRACT

A novel distributed architecture for deploying a plurality of wireless local-area networks is disclosed. The illustrative embodiment enables some of the protocols of a protocol stack to be "off-loaded" from wireless access points to a remote central controller. In particular, protocols whose services operate correctly regardless of the presence or magnitude of processing and communication delays are off-loaded to the central controller, while protocols whose services operate correctly only when delays are below a threshold remain in the wireless access points. The illustrative embodiment thus enables the use of "thin" (i.e., reduced-functionality) access points, thereby reducing cost and facilitating maintenance when deploying multiple wireless local-area networks (for example, on a corporate or academic campus).

23 Claims, 9 Drawing Sheets

OTHER PUBLICATIONS

Ada Che, "Canadian Application No. 2,480,978 Office Action", Oct. 2, 2008, Publisher: Canadian Intellectual Property Office, Published in: CA.

Office Action from Canadian counterpart application dated Nov. 19, 2007.

Office Action from European counterpart application dated Feb. 1, 2008.

Wang Hairong, "CN Application No. 200410012090.2 Office Action", Jan. 23, 2009, Publisher: Patent Office of the People's Republic of China, Published in: CN.

China Patent Office, "Chinese Patent Application No. 200410012090.2 Office Action", Aug. 8, 2008, Publisher: China Patent Office, Published in: CN.

Ebsen, C., "CA Application No. 2,480,978 Office Action Aug. 11, 2005", Publisher: CIPO, Published in: CA.

Hegeman, Hans, "EP Application No. 04255548.2 Office Action Apr. 20, 2007", Publisher: EPO, Published in: EP.

Hegeman, J., "EP Application No. 04255548 European Search Report Aug. 30, 2006", Publisher: EPO, Published in: EP.

Yeong-Sang Jeone, "KR Application No. 10-2004-0078000 Office Action Jun. 20, 2006", Publisher: KIPO, Published in: KR.

* cited by examiner

DISTRIBUTED ARCHITECTURE FOR DEPLOYING MULTIPLE WIRELESS LOCAL-AREA NETWORKS

CROSS-REFERENCE TO RELATED APPLICATIONS

This application claims the benefit of U.S. provisional application Ser. No. 60/431,706, filed Dec. 9, 2002, entitled "Centralized AP Architecture for a WLAN System,", which is also incorporated by reference.

FIELD OF THE INVENTION

The present invention relates to telecommunications in general, and, more particularly, to a novel architecture for deploying a plurality of wireless local-area networks.

BACKGROUND OF THE INVENTION

FIG. 1 depicts a schematic diagram of an exemplary wireless local-area network (LAN) 100 in the prior art comprising access point 101 and stations 102-1 through 102-N, wherein N is a positive integer, interconnected as shown. Each station 102-i, wherein i is a member of the set $\{1, 2, \ldots N\}$, is a device such as a notebook computer, personal digital assistant (PDA), tablet PC, etc. that wirelessly transmits signals to and receives signals from other stations in local-area network 100 via access point 101.

In order for access point 101 and stations 102-1 through 102-N to communicate, they must agree as to the meaning of the signals that they transmit. In particular, they must agree on: who talks when, what constitutes a "0" and a "1," how an error is detected and corrected, etc. In the terminology of telecommunications, these agreements are called protocols, and a particular set of protocols is known as a protocol stack.

Stations and access points typically employ software, hardware, or a combination of software and hardware to implement a particular protocol stack. FIG. 2 depicts a conceptual diagram of two software-based protocol stacks 201 and 202-i that are implemented by access point 101 and station 102-i, respectively, in accordance with the prior art, wherein i is a member of set $\{1, 2, \ldots N\}$.

Telecommunications engineers design protocols to provide a variety of services, such as error control (i.e., detecting and/or correcting bit errors in transmitted data), flow control (i.e., compensating for differences between the rate at which data is transmitted to a device and the rate at which the receiving device processes the data), and medium access control (i.e., ensuring that only one device at a time transmits into a shared communications channel). Because telecommunications systems typically involve a plurality of communicating devices that operate independently, protocols must be able to provide desired behavior (i.e., the protocol services must be correct) for different, and often unpredictable, timing relationships between the devices.

Telecommunications engineers formally describe a protocol via a protocol specification. A protocol specification comprises: (i) a service to be provided; (ii) one or more assumptions about the environment in which the protocol executes; (iii) a vocabulary of messages used to implement the protocol; (iv) an encoding of each message in the vocabulary; and (v) a set of procedure rules guarding the consistency of message exchanges. [*Design and Validation of Computer Protocols*, G. J. Holzmann, Prentice Hall, 1991]

SUMMARY OF THE INVENTION

The present invention enables some of the protocols of a protocol stack to be "off-loaded" from an access point to a remote processor. In particular, the illustrative embodiment employs a remote central controller that can serve a plurality of access points, thus enabling a plurality of wireless local-area networks to be constructed with reduced-functionality access points (i.e., access points that implement a proper subset of a protocol stack) and a single remote controller. By enabling the use of "thin" (i.e., reduced-functionality) access points, the illustrative embodiment offers two benefits: first, it reduces the cost of the access points, which is especially advantageous when deploying a large number of wireless local-area networks (for example, on a corporate or academic campus). Second, the illustrative embodiment can facilitate the maintenance of large numbers of wireless local-area networks, since a substantial number of software updates will often require changes only to the central controller.

The illustrative embodiment is based on the recognition that some protocols operate correctly regardless of timing relationships between events, while other protocols operate correctly only in accordance with one or more particular timing assumptions, such as a maximum timing delay (e.g., a timeout for waiting to receive a message, an inter-frame spacing for medium access control, etc.). In other words, the correctness of some protocol services is independent of any delays or timing anomalies, while the correctness of other protocol services is contingent on communication and processing delays not exceeding a particular threshold.

For the purposes of this specification, a protocol service is defined as "correct" if it operates in accordance with the protocol's specification.

The illustrative embodiment comprises: (a) a plurality of access points, wherein each of the access points performs a first protocol service for a respective network, and wherein the correctness of the first protocol service is based on a maximum timing delay; and (b) a central controller for: (i) receiving an input signal from each of the plurality of access points, and (ii) transmitting to each of the plurality of access points an output signal based on the input signal from that access point and a second protocol service, wherein the correctness of the second protocol service is independent of the maximum timing delay.

DETAILED DESCRIPTION

Figure 1:
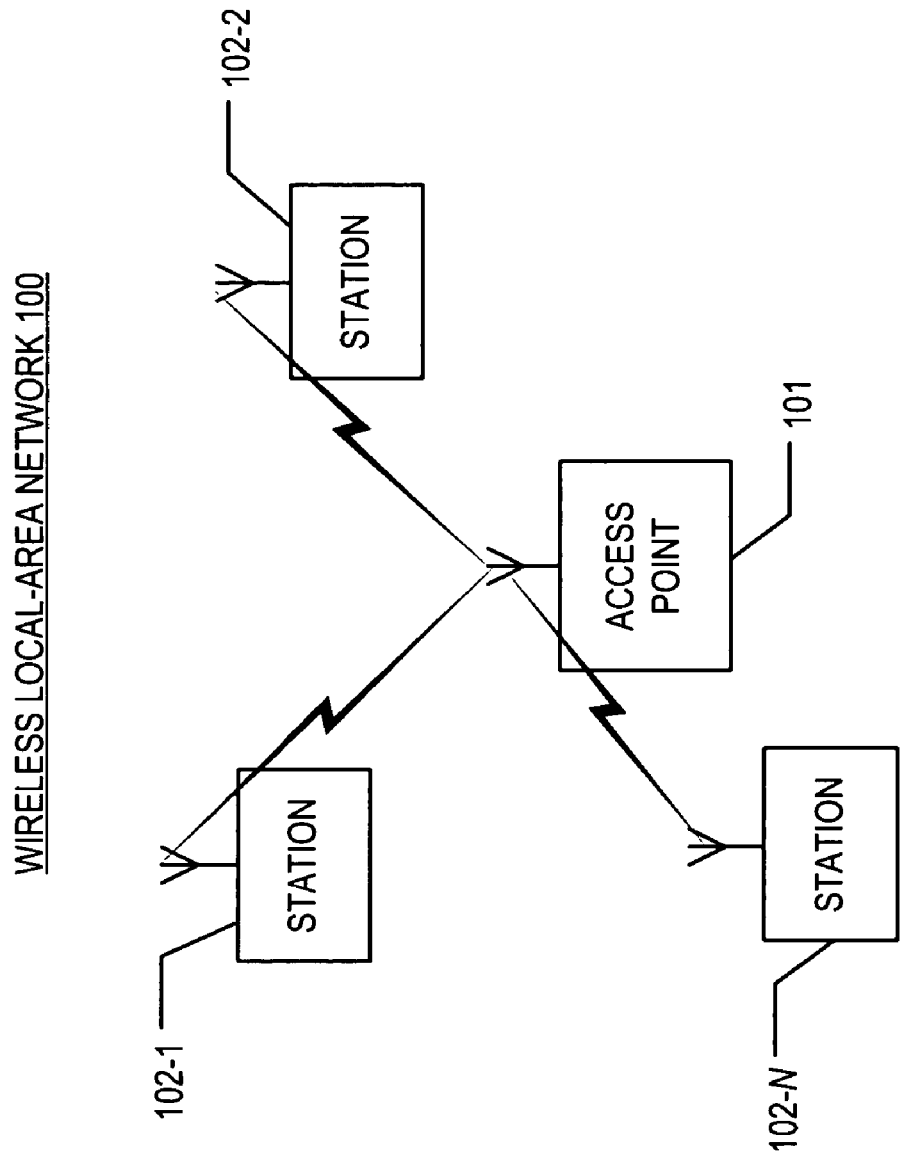
FIG. 1 depicts a schematic diagram of wireless local area network 100 in accordance with the prior art.
Figure 2:
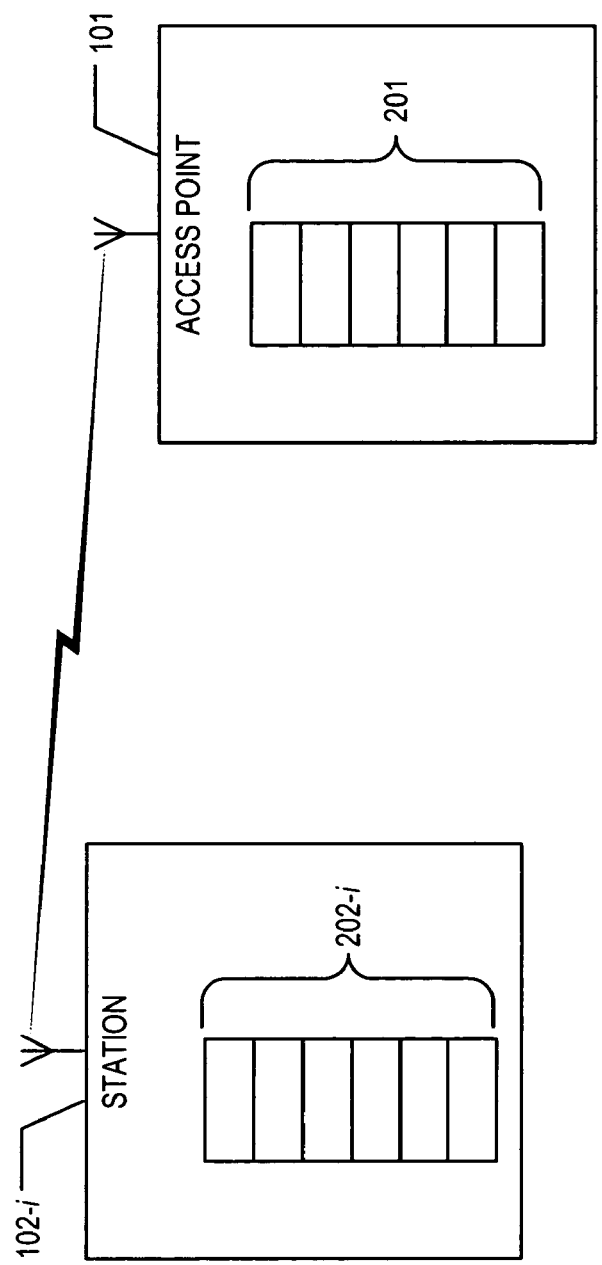
FIG. 2 depicts a conceptual diagram of protocol stacks implemented by access point 101 and station 102-i, as shown in FIG. 1, in accordance with the prior art.
Figure 3:
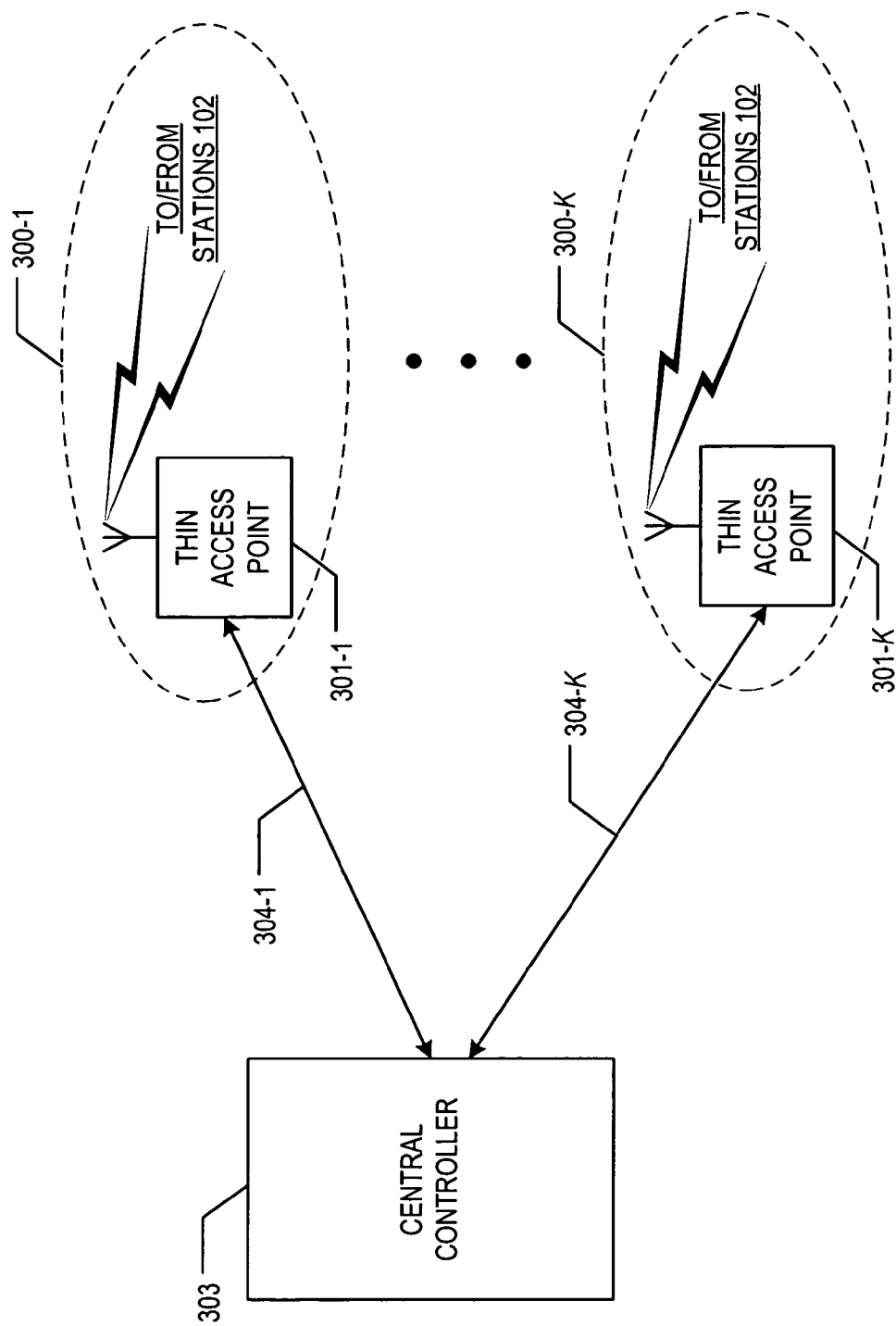
FIG. 3 depicts a schematic diagram of a plurality of local-area networks in accordance with the illustrative embodiment of the present invention.

FIG. 3 depicts a schematic diagram of local-area networks 300-1 through 300-K, where K is a positive integer, in accordance with the illustrative embodiment of the present invention. As shown in FIG. 3, each local-area network 300-i, wherein i∈{1, 2, ... K}, comprises thin wireless access point 301-i, which communicates with wireless stations 102 in network 300-i. Each local-area network 300-i has a respective shared-communications channel; as will be appreciated by those skilled in the art, the separate shared-communications channels might be due to spatial separation, different frequencies, etc.

Each thin wireless access point 301-i is connected to central controller 303 via bi-directional link 304-i. As described in detail below, each thin wireless access point 301-i performs those protocol services whose correctness depends on a maximum timing delay. In addition, when wireless access point 301-i detects a particular condition (e.g., receiving a signal from a station, detecting that the shared-communications channel has been idle for a time interval, etc.) that triggers a protocol service whose correctness does not depend on any maximum timing delay, thin wireless access point 301-i sends a signal to central controller 303 via bi-directional link 304-i to perform the protocol service. Thin wireless access point 301-i also receives signals via bidirectional link 304-i from central controller 303 after central controller 303 has performed the protocol service. A detailed description of the operation of thin wireless access point 301-i is disclosed below and with respect to FIGS. 6 and 8.

Central controller 303 receives signals from thin wireless access points 301-i through 301-K via links 304-1 through 304-K, performs protocol services whose correctness does not depend on any maximum timing delay, and transmits protocol service outputs to thin wireless access points 301-i through 301-K via links 304-1 through 304-K. In some embodiments, central controller 303 might be connected to an external network (e.g., a wide-area network (WAN), the Internet, etc.), thereby functioning as a gateway, as is well-known in the art. In such embodiments, central controller 303 receives messages from the external network and forwards the messages to the appropriate access points for dissemination to the destination stations. In addition, central controller 303 receives from the access points messages that are directed to the external network, and transmits these messages via the external network accordingly. A detailed description of the operation of central controller 303 is disclosed below and with respect to FIGS. 7 and 9.

As will be appreciated by those skilled in the art, in some embodiments bi-directional links 304-1 through 304-K might instead be implemented wirelessly. The illustrative embodiment, however, has the advantage of enabling concurrent communications between central controller 303 and thin wireless access points 301-i through 301-K without any potential transmission interference.

Figure 4:
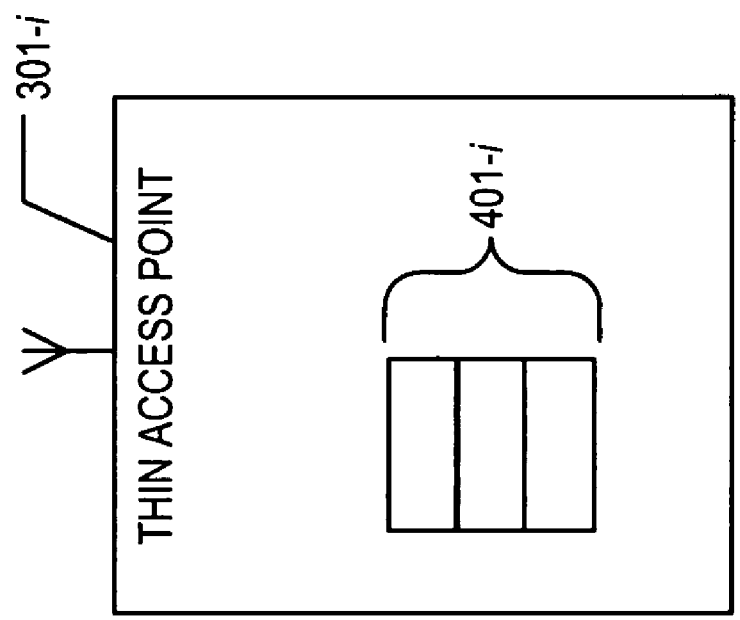
FIG. 4 depicts a conceptual diagram of a protocol stack implemented by access point 301-i, as shown in FIG. 3, in accordance with the illustrative embodiment of the present invention.

FIG. 4 depicts a conceptual diagram of access point 301-i implementing protocol stack 401-i in accordance with the illustrative embodiment of the present invention. Protocol stack 401-i consists of those protocols of stack 201 whose services are correct only if communication and processing delays do not exceed a maximum threshold. For example, in an Institute of Electrical and Electronics Engineers (IEEE) IEEE 802.11b wireless local-area network, protocol services in protocol stack 401-i would include: Distributed Coordination Function (DCF) medium-access control, Point Coordination Function (PCF) medium-access control, error control, and flow control. As will be appreciated by those skilled in the art, all of the aforementioned protocol services belong to the Data Link Layer of the Open Systems Interconnect (OSI) seven-layer model. In addition, protocol stack 401-i includes protocol services of the OSI Physical Layer (e.g., encoding data in radio signals, etc.).

Figure 5:
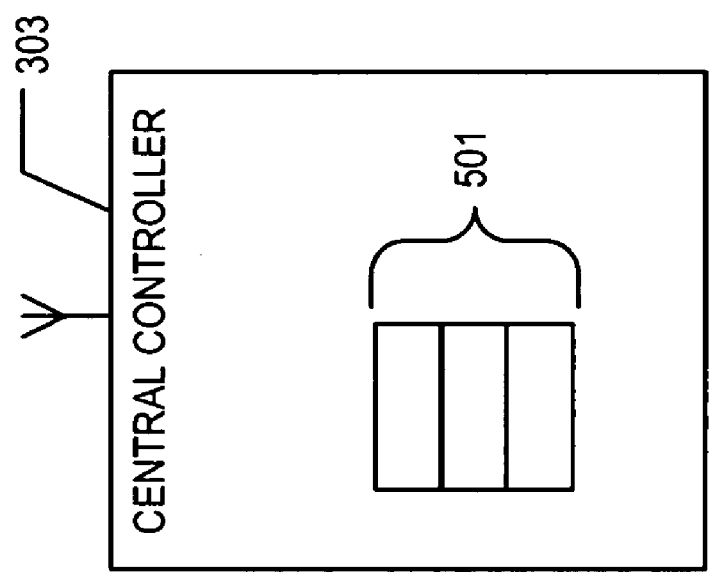
FIG. 5 depicts a conceptual diagram of a protocol stack implemented by central controller 303, as shown in FIG. 3, in accordance with the illustrative embodiment of the present invention.

FIG. 5 depicts a conceptual diagram of central controller 303 implementing protocol stack 501 in accordance with the illustrative embodiment of the present invention. Protocol stack 501 consists of those protocols of stack 201 whose services are correct regardless of the presence or magnitude of any communication or processing delays. For example, in an IEEE 802.11b wireless local-area network, protocol services in protocol stack 501 might include generating a polling list for the Point Coordination Function (PCF) and Wi-Fi Protected Access (WPA) authentication. In a wireless local-area network that supports IEEE 802.11e, an extension of 802.11b proposed by IEEE Task Group E that enables quality-of-service (QoS), protocol services in protocol stack 501 could also include traffic monitoring, determining Enhanced Distributed Coordination Function (EDCF) parameters for different traffic classes, etc.

Figure 6:
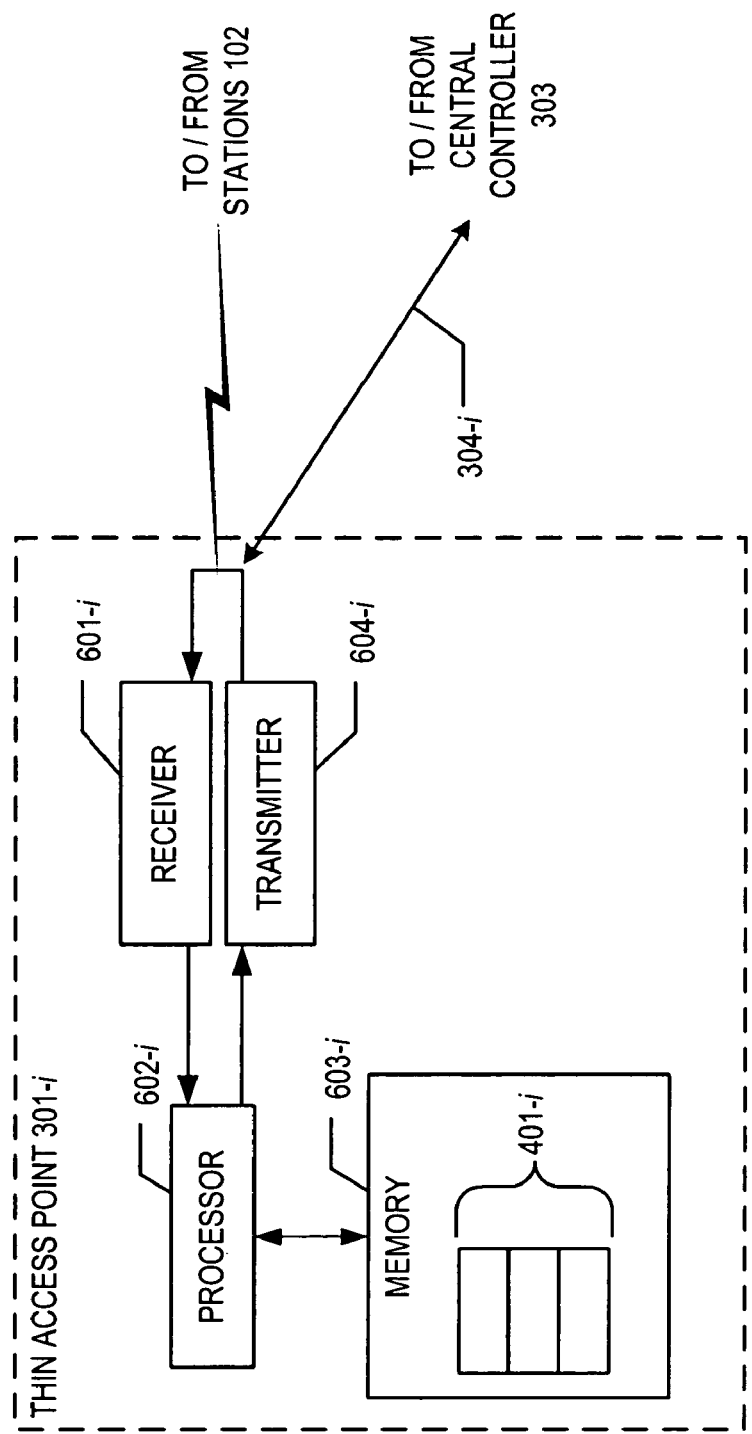
FIG. 6 depicts a block diagram of the salient components of access point 301-i, as shown in FIG. 3, in accordance with the illustrative embodiment of the present invention.

FIG. 6 depicts a block diagram of the salient components of thin access point 301-i in accordance with the illustrative embodiment of the present invention. As shown in FIG. 6, thin access point 301-i comprises receiver 601-i, processor 602-i, memory 603-i, and transmitter 604-i, interconnected as shown.

Receiver 601-i is a circuit that is capable of receiving signals over a wireless shared-communications channel, in well-known fashion, and of forwarding them to processor 602-i. In addition, receiver 601-i receives signals from central controller 303 over link 304-i in well-known fashion. As will be appreciated by those skilled in the art, in some embodiments of the present invention receiver 601-i might be a single receiver that can receive signals both wirelessly and via wireline, while in some other embodiments receiver 601-i might comprise two physical receivers (for example, a radio and an Ethernet network interface card). In any case it will be clear to those skilled in the art how to make and use receiver 601-i.

Processor 602-i is a general-purpose processor that is capable of executing instructions stored in memory 603-i, of reading data from and writing data into memory 603-i, and of executing the tasks described below and with respect to FIG. 8. In some alternative embodiments of the present invention, processor 602-i might be a special-purpose processor. In either case, it will be clear to those skilled in the art how to make and use processor 602-i.

Memory 603-i is capable of storing data and programs, including protocol stack 401-i, used by processor 602-i, as is well-known in the art, and might be any combination of random-access memory (RAM), flash memory, disk drive, etc. It will be clear to those skilled in the art how to make and use memory 603-i.

Transmitter 604-i is a circuit that is capable of receiving signals from processor 602-i, in well-known fashion, and of transmitting corresponding signals (i) over a wireless shared-communications channel, and (ii) over link 304-i, in well-known fashion. As will be appreciated by those skilled in the art, in some embodiments of the present invention transmitter 604-i might be a single transmitter that can transmit signals both wirelessly and via wireline, while in some other embodiments transmitter 604-i might comprise two physical transmitters (for example, a radio and an Ethernet network interface card). In any case it will be clear to those skilled in the art how to make and use transmitter 604-i.

Figure 7:
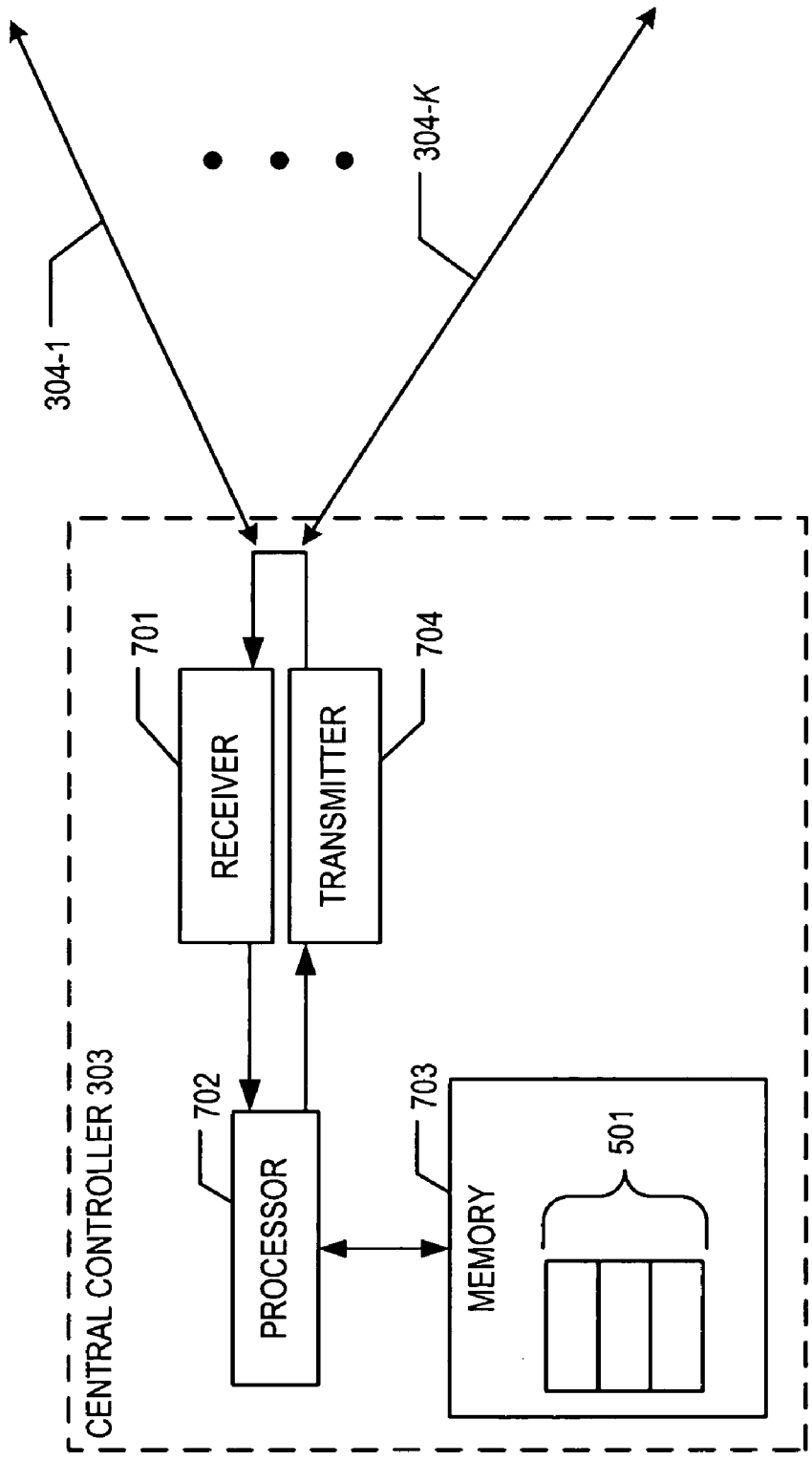
FIG. 7 depicts a block diagram of the salient components of central controller 303, as shown in FIG. 3, in accordance with the illustrative embodiment of the present invention.

FIG. 7 depicts a block diagram of the salient components of central controller 303 in accordance with the illustrative embodiment of the present invention. As shown in FIG. 7, central controller 303 comprises receiver 701, processor 702, memory 703, and transmitter 704, interconnected as shown.

Receiver 701 is a circuit that is capable of receiving signals over links 304-1 through 304-K, in well-known fashion, and of forwarding them to processor 702. In addition, as described above, in some embodiments receiver 701 might also receive messages from an external network (e.g., a wide-area network, the Internet, etc.). It will be clear to those skilled in the art how to make and use receiver 701.

Processor 702 is a general-purpose processor that is capable of executing instructions stored in memory 703, of reading data from and writing data into memory 703, and of executing the tasks described below and with respect to FIG. 9. In some alternative embodiments of the present invention, processor 702 might be a special-purpose processor. In either case, it will be clear to those skilled in the art how to make and use processor 702.

Memory 703 is capable of storing data and programs, including protocol stack 501, used by processor 702, as is well-known in the art, and might be any combination of random-access memory (RAM), flash memory, disk drive, etc. It will be clear to those skilled in the art how to make and use memory 703.

Transmitter 704 is a circuit that is capable of receiving signals from processor 702, in well-known fashion, and of transmitting corresponding signals over links 304-1 through 304-K, in well-known fashion. In addition, as described above, in some embodiments transmitter 704 might also transmit messages on to an external network (e.g., a wide-area network, the Internet, etc.). It will be clear to those skilled in the art how to make and use transmitter 704.

Figure 8:
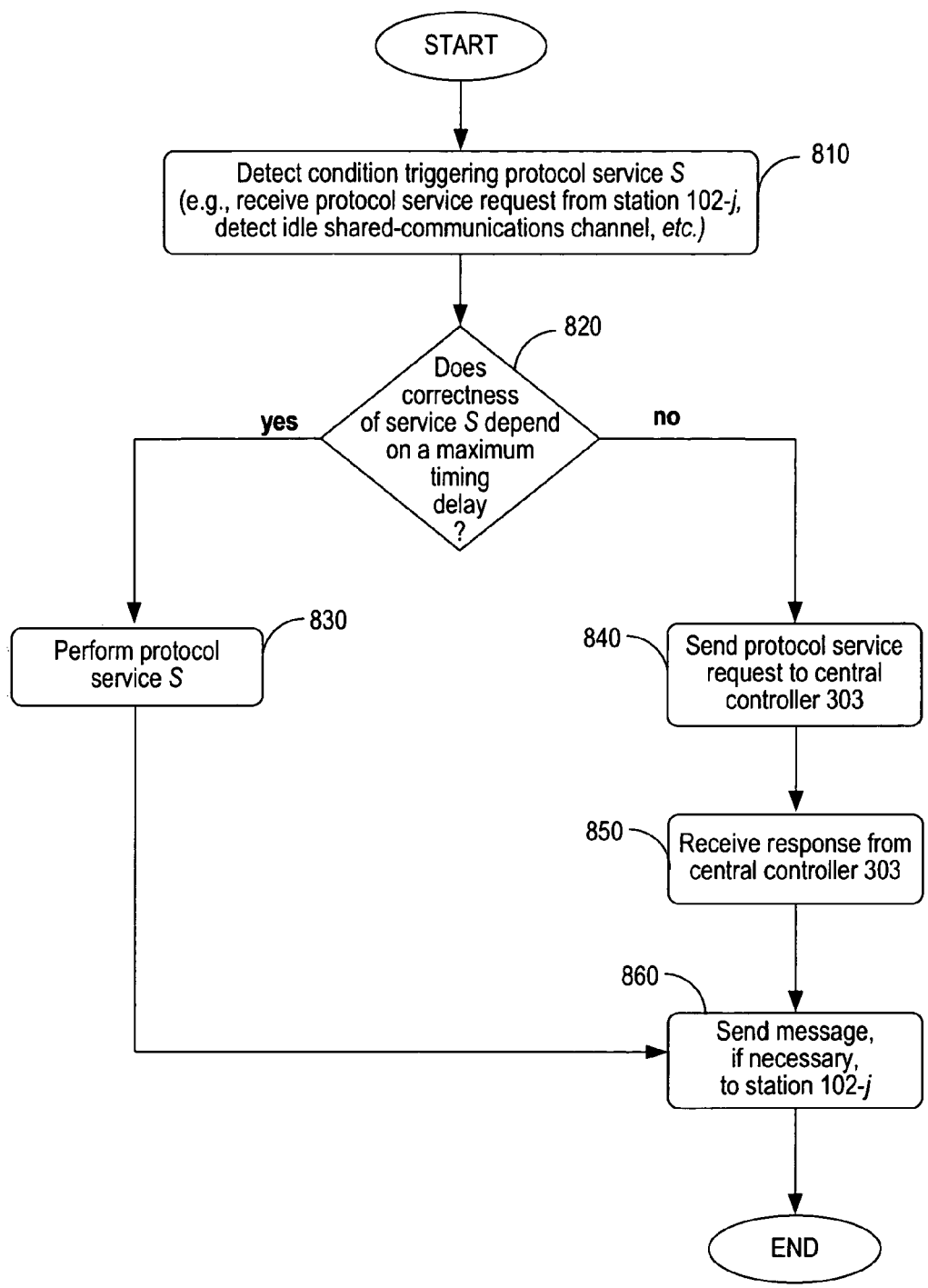
FIG. 8 depicts a flowchart of the operation of access point 301-i, as shown in FIG. 3, in accordance with the illustrative embodiment of the present invention.

FIG. 8 depicts a flowchart of the operation of access point 301-i in accordance with the illustrative embodiment of the present invention.

At task 810, access point 301-i detects a particular condition (e.g., receiving a protocol service request from a station 102-j, detecting that the shared-communications channel has been idle for a time interval, etc.) that triggers a protocol service S.

At task 820, access point 301-i checks whether protocol service S is a service whose correctness depends on a maximum timing delay. If so, execution continues at task 830, otherwise execution proceeds to task 840.

At task 830, access point 301-i performs protocol service S, the code for which is in protocol stack 401-i in memory 603-i. After completion of task 830, execution proceeds to task 860.

At task 840, access point 301-i sends, via transmitter 604-i, a request to central controller 330 to perform protocol service S, along with any necessary information (e.g., input variables, etc.).

At task 850, access point 301-i receives, via receiver 601-i, a response from central controller 330 after central controller 330 has performed protocol service S.

At task 860, access point 301-i sends, if necessary, a message via transmitter 604-i to station 102-j that indicates that protocol service S has been performed. As will be appreciated by those skilled in the art, such a message, which might include an acknowledgement, an output value, etc., might be appropriate for some protocol services requested by station 102-j, but might be unnecessary for other protocol services requested by station 102-j, or protocol services triggered by other events (e.g., an idle shared-communications channel, etc.) After completion of task 860, the method of FIG. 8 terminates.

Figure 9:
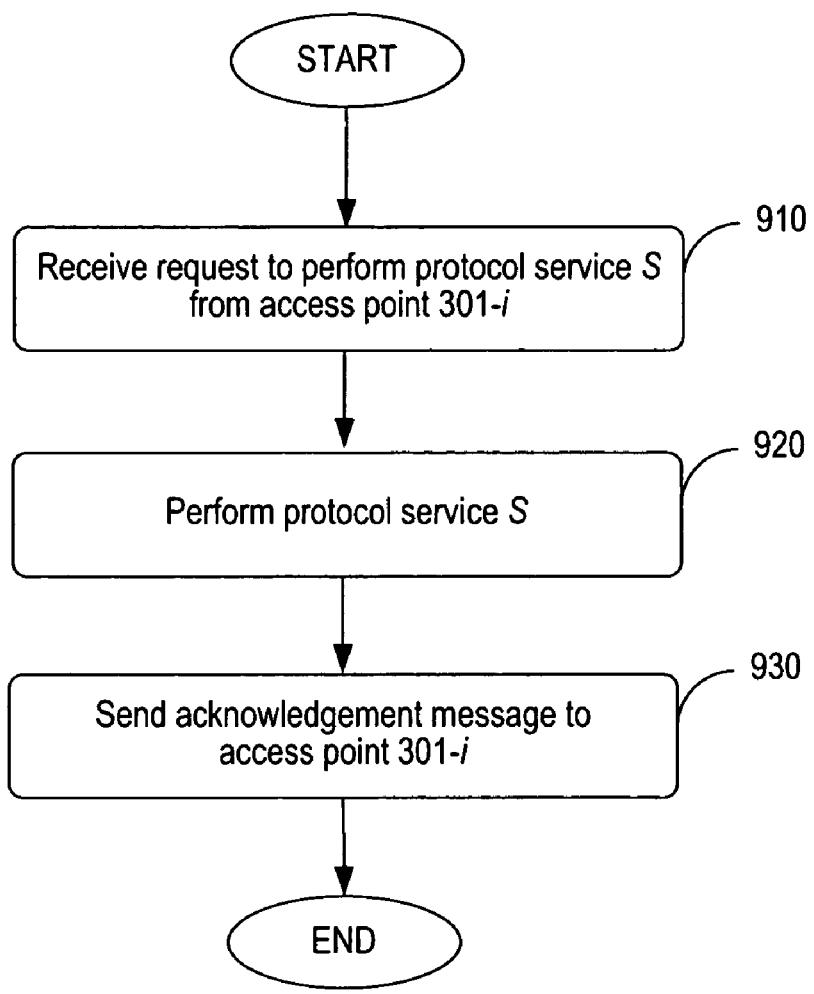
FIG. 9 depicts a flowchart of the operation of central controller 303, as shown in FIG. 3, in accordance with the illustrative embodiment of the present invention.

FIG. 9 depicts a flowchart of the operation of central controller 303, in accordance with the illustrative embodiment of the present invention.

At task 910, central controller 303 receives, via receiver 701, a request from access point 301-i to perform a protocol service S. As described above in task 840, the request might also contain input variables or additional information needed for central controller 303 to perform service S.

At task 920, central controller 303 performs protocol service S, the code for which is in protocol stack 501 in memory 703.

At task 930, central controller 303 sends an acknowledgement message via transmitter 704 to access point 301-i that indicates that protocol service S has been performed. As will be appreciated by those skilled in the art, for some protocol services the acknowledgement message might also include additional output information (e.g., issued EDCF parameters for an IEEE 802.11e network, etc.). After completion of task 930, the method of FIG. 9 terminates.

Illustrative Embodiment: IEEE 802.11

The remainder of the detailed description discloses a particular embodiment of the present invention for IEEE 802.11 wireless local-area networks, including the proposed IEEE 802.11e specification. As will be appreciated by those skilled in the art, this is just one example of an embodiment of the present invention.

Introduction

Wireless communications involves a radio that communicates wirelessly with the subscribers in a limited area around it and with the larger network through a wired connection. In cellular communications one or more radio(s) reside at what is known as the base station. The coverage area within which subscribers may communicate wirelessly is known as the 'cell'. Analogous notions in wireless LANs (WLANs) are the access point (AP) and the Basic Service Area (BSA), respectively. The collection of clients served by an AP is known as the Basic Service Set (BSS).

Wireless LANs provide wireless peer-to-peer communication between stations and access to the wired network. A collection of stations communicating directly via the wireless medium is known as an ad hoc network. Stations may communicate with stations in a different WLAN cell with the aid of a wired backbone network, known as the distribution system. An AP is a station that serves as a gateway to the distribution system; it is analogous to the base station of a cellular communications network. A single-cell wireless LAN is adequate for a home or a small office. Multiple-cell wireless LANs are used to cover larger buildings or spaces.

Wireless LAN standards specify the protocols for the physical and MAC layers. IEEE 802.11 is the standard dominating the wireless LAN market today. IEEE 802.11g is the newest 802.11 standard—finalized in 2003—which provides higher speeds than 802.11b in the unlicensed 2.4 GHz ISM band. IEEE 802.11a, the 5 GHz extension to 802.11b/g provides high speeds. Other wireless LAN standards include: HiperLAN/2 (the European counterpart to the "American" 802.11a standard).

WLANs operate in the unlicensed portions of the spectrum, where they provide interference-free simultaneous transmissions on multiple channels; each cell transmits on a single time division duplex (TDD) channel. Channel access mechanisms for asynchronous data transfer fall into two categories: distributed contention based and centralized contention free. Under contention-based access methods, stations access the channel when there is data to transmit, thus risking collision with transmissions attempted by other stations. The distributed random access protocol in 802.11 WLANs is known as the distributed coordination function (DCF). In the QoS-enhanced protocol in the proposed 802.11e draft standard, known as the enhanced distributed coordination function (EDCF), stations access the channel according to the priority of their traffic. Contention-free access methods permit a single station to transmit at a time. With centralized contention-free protocols, a controller—typically the AP—polls stations to send or receive data. The deterministic polling protocol in 802.11 wireless LANs is known as the point-coordination function (PCF). The QoS-enhanced protocol in the 802.11e draft standard, known as the hybrid coordination function (HCF), also employs polling for contention-free access, but with increased channel use efficiency.

Stations associated with a cell, or a basic service set (BSS), compete for channel access for a variety of reasons. These include the transmission of data packets; the reservation of the channel for the transmission of data packets; or the reservation on the polling list of a deterministic multiple access protocol, like PCF or HCF. The PCF and HCF rely on distributed multi-access methods to claim the channel.

The DCF employs the Ethernet MAC protocol, which has been adapted to provide the basic access mechanism for 802.11 WLANs. The rules for channel access prohibit a station from attempting transmission of a newly arrived packet if the channel is busy. Carrier sensing is used in order to determine whether the channel is idle. If not idle, transmission is deferred by a randomly selected delay following completion of the current transmission; this avoids collision with transmission attempts by other stations waiting for the release of the channel. This deferral time is used to set the backoff timer, which is decreased only when the channel remains idle following a transmission for a period equal to the Distributed Inter-Frame Space (DIFS). A station attempts transmission when this timer expires. The AP is allowed to access the medium sooner (after a PIFS) idle time interval.

EDCF varies, according to the priority of the traffic, the length of the time interval a station waits for an idle time interval before attempting transmission, or before counting down, immediately following a busy period, This time interval, which is known as the Arbitration-Time Inter-Frame Space (AIFS), is shorter for higher priority packets, enabling them to get to the channel faster. Once this time expires, the backoff counter is decreased whenever the channel is idle for a time interval equal to the time slot.

Centralized MAC Architecture

In order to reduce the expense and complexity of base stations/APs in wireless communications systems, it is possible to limit their functionality and offer complementary functionality at a single remote controller. Such arrangement reduces the cost and complexity of the access points, which is especially advantageous when deploying a large number of wireless local-area networks (for example, on a corporate or academic campus). Base stations in cellular can consist of RF transmitters/receivers relaying signals back and forth to the MSC for processing.

The idea of reducing the complexity of an AP applies also to WLANs, but with some limitations. Unlike in cellular systems, transmission in a WLAN relies on random access through tightly timed frame exchanges. In other words, the rules governing whether or not a stationary attempt transmission are based on the time that elapsed since the medium became idle following a medium busy condition. Introducing a delay in registering the 'end-of-busy' time would put the station—in this case the AP—at a disadvantage relative to other stations competing for access to the wireless medium, as the latter will have a head start in counting down the elapsed idle time. With synchronization based on carrier sensing and a highly interactive MAC protocol, the communication delays between the RF component performing carrier sensing and access control must be minimal. In particular, introducing a transmission delay from the AP to the controller of 5 microsecs (on an 802.11b WLAN) or greater delays the AP's response so that its attempted transmission might collide with a frame from a station. In general, the delayed AP responses will disadvantage it with respect to access to the wireless medium.

To illustrate the potentially undesirable results of improperly centralizing AP functionality, consider the following example. The components of a WLAN IC chip set consist of the following: (1) the radio front end, which transmits and receives the signal; (2) the baseband processor, which modulates and demodulates the signal; and (3) the media access controller, or MAC, which handles the protocol translation and control. Suppose that the AP's media access controller resides at a remote gateway/switch, which is separated by a wired Ethernet link from the radio front end and baseband processor, both located at the BSA. It is assumed that the STA has all components co-located, hence the communication delay between the radio front end and media access controller are negligible. Suppose now that the STA and the AP both have frames pending transmission. Consider an AP and several stations operating on an 11 Mbps 802.11b link. A communication delay on the AP side in excess of 5 microsec would cause the AP to have a delayed response to the end of a medium busy period. While the MAC protocol allows the AP to access the medium sooner (after a PIFS) idle time interval, the AP's delayed response would cause it to transmit after an idle time interval of length DIFS or longer, causing possible collisions with stations.

This example therefore provides guidelines for partitioning the AP functions into two parts, (1) a 'thin' AP and (2) a centralized controller so that the resulting MAC performance does not suffer, and the AP has minimal functionality.

In this example, the centralized AP controller is referred to as the QoS Cell Manager (QCM). The QCM can co-exist in the Gateway together with other centralized functions, like Self-Configuration (which performs RF planning and radio resources management tasks). The QCM serves a multitude of 'thin' APs that are located in each cell. The 'thin' AP must perform the radio and baseband processing functions, but is not limited to these functions alone. The QCM provides the AP functions complementary to those residing in the 'thin' AP. The medium access controller functions can be split between the QCM and the thin AP. In this paper, we refer to a 'thin' AP as an Access Port, which is designated by the lower case abbreviation 'ap'.

In this example, the QCM is embedded in a gateway (e.g., for connecting to the Internet, etc.) All intelligence may reside at the QCM. The QCM monitors traffic and issues a QoS information element containing the EDCF parameters; i.e. AIFS, CWmin, CWmax, PF, MSDULifetime, etc. In this example, the QCM performs admission control upon receipt of a TSPEC request from a STA. To the extent this request involves a traffic stream going through the network (other than sidelink traffic), acceptance or rejection of a request would be communicated to upper layers. The QCM generates a Polling Schedule and reissues it as needed, based on the demand. Upon receipt of an RR, the QCM supplies a Real-Time Polling schedule. Finally, the QCM is responsible for scheduling downlink traffic. In doing so it and designates the content of TXOPs which is forwarded to the ap for transmission. In performing these functions, the QCM receives from the client information that is transparently routed through the ap. Alternatively, some of these functions may be relegated to the ap.

The minimal functionality of an ap is the transmission of TXOPs and polling. This involves the following:

Buffering of MPDU fragments and TXOP contents

Carrier sensing—determining whether the wireless medium is idle.

Medium access control (—IFS delay and backoff)—If the channel is idle, the wireless medium may be accessed following a PIFS idle period and any required backoff interval.

Acknowledgement—Following the successful receipt of a transmission, the ap will send acknowledgment. If after transmitting a frame or a poll, an acknowledgement is not received within a SIFS time interval, the ap will respond accordingly.)

Polling—The ap transmits the MSDUs received from the QCM and buffered at the ap. If a TXOP overlaps a polling schedule, the ap will interleave polls with MPDUs according to the specified schedule.

Reassembly of MPSDUs and transmission to the QCM

In addition, the ap may perform other functions, which would be otherwise be carried out by the QCM.

In this example, clients interoperate with the ap-QCM complex via the IEEE 802.11e protocols. The split of the AP functionality is transparent to the clients, which are the 802.11 stations. Communication between the ap and the QCM can be done through a wired or wireless connection, according a proprietary protocol a the MAC layer.

Network Management Functions

In a centralized architecture, key AP functions are split between the QCM and the access port. In addition, the QCM may contain intelligent network management functions that not described by standards. In this example, the following network management functions reside in the QCM: TSPEC Admission Control, Traffic Monitoring, and Scheduling.

TSPEC Admission Control

The QCM is responsible for admission of TSPEC requests for TXOPs by traffic streams routed either through the AP (and distribution system) or peer to peer within a cell. If a TSPEC request provides a range of service parameters, there will be room for negotiation of the TXOP schedule, before a final schedule is set. If there is no TSPEC request made and/or a TSPEC is not available, the upper layers will provide a nominal TSPEC request through the Gateway. Ideally, TSPEC admission decisions would be incorporated in call admission control taking place in higher layers. TSPEC admission control will take into account the priority and parameter of the request for TXOPs, the commitments made to TSPEC requests already admitted, the margin for spectrum re-allocation through schedule negotiation of admitted TSPEC requests, and the load on the wireless link in the cell.

For example, a TSPEC request of a given priority would be accepted if the WLAN is lightly loaded, but denied if the bandwidth committed to TSPEC requests exceed a corresponding threshold value. These threshold values would increase with priority.

Traffic Monitor

The QCM is responsible for setting the parameters of the random access protocol. For instance, in IEEE 802.11e, the QoS information element contains the EDCF parameters. These parameters are adapted by monitoring the wireless channel to determine the number/frequency of collisions and successful transmissions. Information is also provided by the clients on the success and failure rate of transmissions by traffic category. With this information, the QCM will adapt the EDCF parameters for each category in order to meet QoS requirements.

Scheduler

The QCM schedules transmissions on the wireless link. It sequences for transmission the downlink frames and packages them into TXOPs that are sent to the ap, one at a time. Transmission of downlink TXOPs may be coupled with polling in CAPs. Selection of the frames placed in a CAP and their sequencing is designed to reflect QoS objectives, such as maximizing throughput and meeting latency and jitter restrictions.

AP Functions

In accordance with this example, the AP functions are shared between the QCM and the access port. In theory, the ap functions may range between the minimum functionality described herein and the complete set of AP functions. The following functions of an access point are described below: Downlink Transmission, Polling, and EDCF uplink transmission.

Downlink Transmission

The QCM pre-packages a TXOP and sends it to the ap for transmission together with polling instructions, if applicable. Fragmentation of frames received at the MAC sublayer from upper layers—known as the MSDUs (MAC Service Data Units)—may be performed either by the QCM or by the ap. The ap transmits the fragments, MPDUs (MAC Protocol Data Units), receives acknowledgements and, if possible, retransmits failed MPDUs. Upon expiration of a TXOP time limit, the ap returns an acknowledgement vector (VACK) to the QCM. The vector acknowledgement indicates whether and which of the TXOP frames failed transmission, as it consists of 0s or 1s indicating whether the individual frames are successfully transmitted (bit set to 0) or not (bit set to 1). VACK is ANDed with a mask of 1s corresponding to the transmitted frames. If the returned VACK=0, all frames have been successfully transmitted. If certain frames failed earlier transmission attempts, the QCM determines whether they should be retransmitted, and if so, will incorporate them into subsequent TXOPs.

Polling

The QoS Cell Manager queues traffic and schedules MSDUs to be transmitted within a CAP according to the time-to-live/priority/jitter sensitivity. Use of non-standard queues and queue management methods will be pursued to this end.

The QCM determines the real-time poll schedule and data/poll interleaving. The real-time poll schedule is more specific than the schedule issued upon TSPEC acceptance. The former specifies the clock time range within which a poll must be sent to a client. The ap buffers (and fragments) any MSDUs included in the CAP, it transmits MPDUs and polls on the wireless channel according to received schedule, returns a vector ACK to the QCM for the downlink MSDUs in the CAP, and sends data received from clients to QCM. It also repeats unanswered polls, provided there is time left in the CAP. If fragmentation takes place in the ap, reassembly of MSDUs will also take place in the ap.

EDCF Uplink Transmission

The ap handles RTS/CTS exchanges as specified for the AP by the 802.11 standard. The ap responds to an RTS with a CTS and acknowledges the receipt of frames from clients. It then forwards the data to the QCM.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
    (a) a plurality of access points, wherein each of said access points is for performing a first non-empty set of protocol services, but not a second non-empty set of protocol services, for a respective network, and wherein the correctness of each protocol service in said first set is based on a maximum timing delay, and wherein the correctness of each protocol service in said second set is independent of said maximum timing delay; and
    (b) a central controller for:
        (i) performing said second non-empty set of protocol services,
        (ii) receiving an input signal from each of said plurality of access points, and
        (iii) transmitting to each of said plurality of access points an output signal based on the input signal from that access point and a protocol service that belongs to said second set of protocol services;
    wherein said first set and said second set constitute a partition of the set of protocol services of a protocol stack.

2. The apparatus of claim 1 wherein a protocol service in said first set belongs to a layer selected from the group consisting of: physical layer, and data link layer.

3. The apparatus of claim 2 wherein said protocol service in said first set is selected from the group consisting of: a medium access control service, an error control service, and a flow control service.

4. The apparatus of claim 1 wherein said protocol service in said second set is selected from the group consisting of: an authentication service, an authorization service, a traffic monitoring service, an admission control service, and a polling list maintenance service.

5. The apparatus of claim 1 wherein said central controller is also for:
    (iv) receiving a datum via a wide-area network, and
    (v) transmitting said datum to at least one of said access points.

6. The apparatus of claim 1 wherein said protocol stack is Institute of Electrical and Electronics Engineers 802.11e.

7. A method comprising:
    (a) performing one or more of a first non-empty set of protocol services using a first processor, wherein the correctness of each protocol service in said first set is based on a maximum timing delay, and wherein said first processor is programmed to perform each protocol service in said first set;
    (b) transmitting a first signal to a second processor, wherein said second processor is programmed to perform each of a second non-empty set of protocol services, and wherein the correctness of each protocol service in said second set is independent of said maximum timing delay, and wherein said second processor is not programmed to perform any of said first set of protocol services, and wherein said first processor is not programmed to perform any of said second set of protocol services, and wherein said first set and said second set constitute a partition of the set of protocol services of a protocol stack; and
    (c) receiving from said second processor a second signal based on a protocol service in said second set.

8. The method of claim 7 wherein the performing of one or more protocol services at said first processor is in response to the detection of a first condition.

9. The method of claim 8 wherein said first condition comprises the transmission of a signal over a shared-communications channel.

10. The method of claim 8 wherein said first condition comprises an idle time interval for a shared-communications channel.

11. The method of claim 8 wherein the transmission of said first signal to said second processor is in response to the detection of a second condition.

12. The method of claim 11 wherein said second condition comprises the transmission of a signal over a shared-communications channel.

13. The method of claim 11 wherein said second condition comprises an idle time interval for a shared-communications channel.

14. The method of claim 7 wherein the transmission of said first signal to said second processor is in response to the detection of a condition.

15. The method of claim 14 wherein said condition comprises at least one of: (i) the transmission of a signal over a shared-communications channel, and (ii) an idle time interval for said shared-communications channel.

16. The method of claim 14 wherein said protocol stack is Institute of Electrical and Electronics Engineers 802.11e.

17. The method of claim 7 wherein a protocol service in said first set belongs to a layer selected from the group consisting of: physical layer, and data link layer.

18. The method of claim 17 wherein said protocol service in said first set is selected from the group consisting of: a medium access control service, an error control service, and a flow control service.

19. The method of claim 17 wherein said protocol service in said second set is selected from the group consisting of: an authentication service, an authorization service, a traffic monitoring service, an admission control service, and a polling list maintenance service.

20. A method comprising:
    (a) performing a first protocol service for a first network using a first processor, wherein said first protocol service belongs to a first non-empty set of protocol services, and wherein the correctness of each protocol service in said first set is based on a maximum timing delay, and wherein said first processor is programmed to perform each protocol service in said first set;
    (b) performing said first protocol service for a second network using a second processor;
    (c) transmitting a first signal from said first processor to a third processor;
    (d) performing a second protocol service for said first network using said third processor, wherein said second protocol service belongs to a second non-empty set of protocol services, and wherein the correctness of each protocol service in said second set is independent of said maximum timing delay, and wherein said third processor is programmed to perform each protocol service in said second set, and wherein said third processor is not programmed to perform any of said first set of protocol services, and wherein said first processor is not programmed to perform any of said second set of protocol services, and wherein said first set and said second set constitute a partition of the set of protocol services of a protocol stack;

(e) transmitting a second signal from said third processor to said first processor, wherein said second signal is based on said second protocol service;

(f) transmitting a third signal from said second processor to said third processor;

(g) performing said second protocol service for said second network using said third processor; and (h) transmitting a fourth signal from said third processor to said second processor, wherein said fourth signal is based on a protocol service in said second set.

21. The method of claim 20 wherein said first protocol service belongs to a layer selected from the group consisting of: physical layer, and data link layer.

22. The method of claim 21 wherein said first protocol service is selected from the group consisting of: a medium access control service, an error control service, and a flow control service.

23. The method of claim 20 wherein said second protocol service is selected from the group consisting of: an authentication service, an authorization service, a traffic monitoring service, an admission control service, and a polling list maintenance service.

* * * * *

UNITED STATES PATENT AND TRADEMARK OFFICE
CERTIFICATE OF CORRECTION

PATENT NO. : 7,606,208 B2
APPLICATION NO. : 10/731348
DATED : October 20, 2009
INVENTOR(S) : Mathilde Benveniste It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Fifth Day of October, 2010

David J. Kappos
*Director of the United States Patent and Trademark Office*